United States Patent [19]
Kang

[11] Patent Number: 5,636,061
[45] Date of Patent: Jun. 3, 1997

[54] ZOOM LENS

[75] Inventor: Geon-Mo Kang, Kyeongsangnam-do, Rep. of Korea

[73] Assignee: Samsung Aerospace Industries, Ltd., Kyeongsangnam-do, Rep. of Korea

[21] Appl. No.: 515,628

[22] Filed: Aug. 16, 1995

[30] Foreign Application Priority Data

Aug. 19, 1994 [KR] Rep. of Korea ............... 94/-20511

[51] Int. Cl.⁶ .................................................. G02B 15/14
[52] U.S. Cl. .................................................. 359/692
[58] Field of Search ............................... 359/692, 691

[56] References Cited

FOREIGN PATENT DOCUMENTS 1-193808  8/1989  Japan .
1-288823  11/1989  Japan .

*Primary Examiner*—Scott J. Sugarman
*Attorney, Agent, or Firm*—Finnegan, Henderson, Farabow, Garrett & Dunner, L.L.P.

[57] ABSTRACT

A zoom lens system using inexpensive lens materials and having a high magnification zoom ratio of more than 2 times and good aberration performance. A first lens group has a positive refractive power, and a second lens group has a negative refractive power. The distance between the first lens group and the second lens group varies during zooming. $0.37 < f_I/(f_{bT} - f_{bw}) < 0.7$; $m_{2T}/m_{2w} > 2.0$, where $f_I$ is a combined focal length of the first lens group, $f_{bT}$ is a back focus distance at a telephoto position $f_{bw}$ is a back focus distance at a wide angle position, $m_{2T}$ is a magnification of the second lens group at a telephoto position, and $m_{2w}$ is a magnification of the second lens group at a wide angle position.

5 Claims, 12 Drawing Sheets

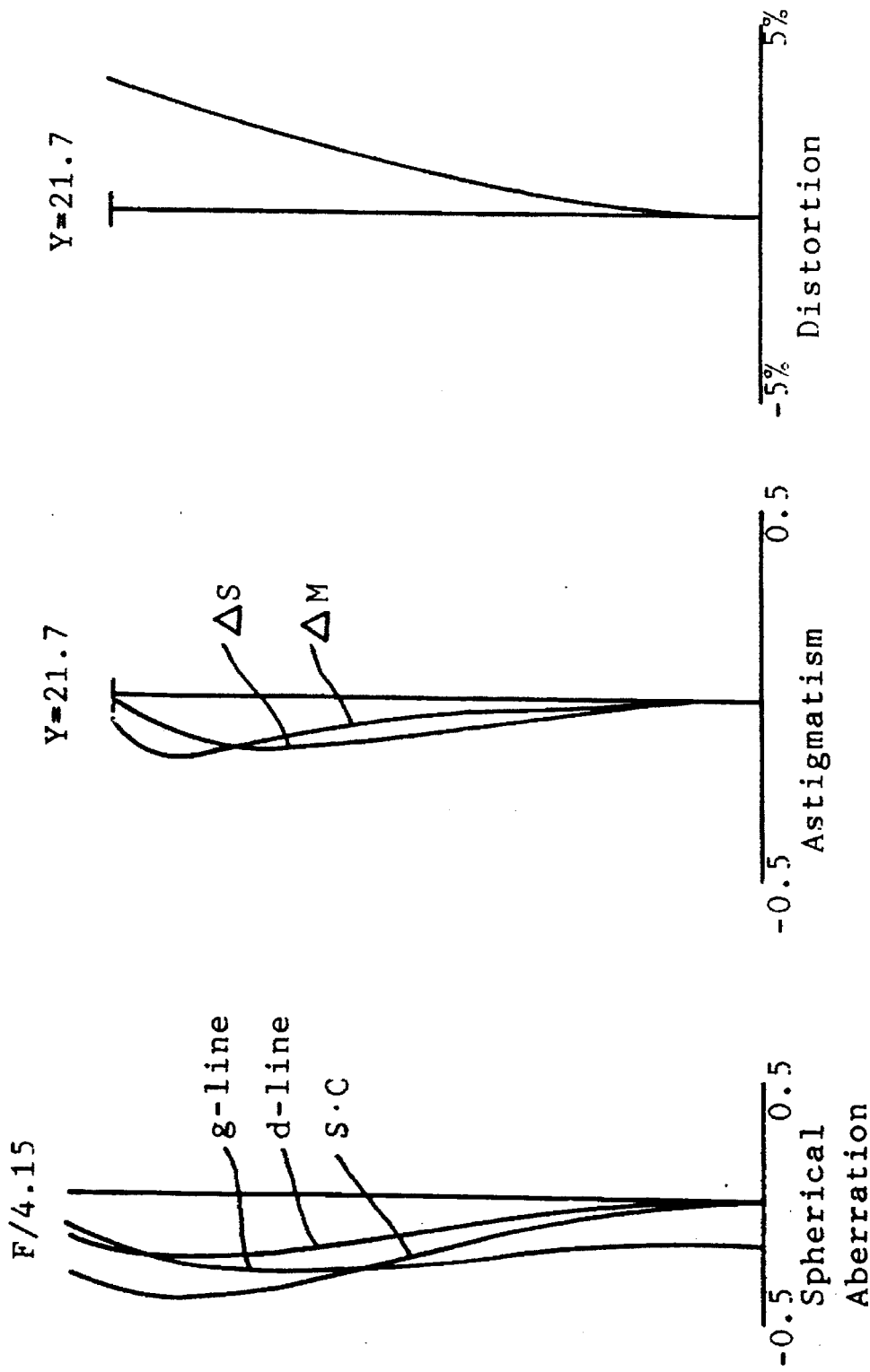

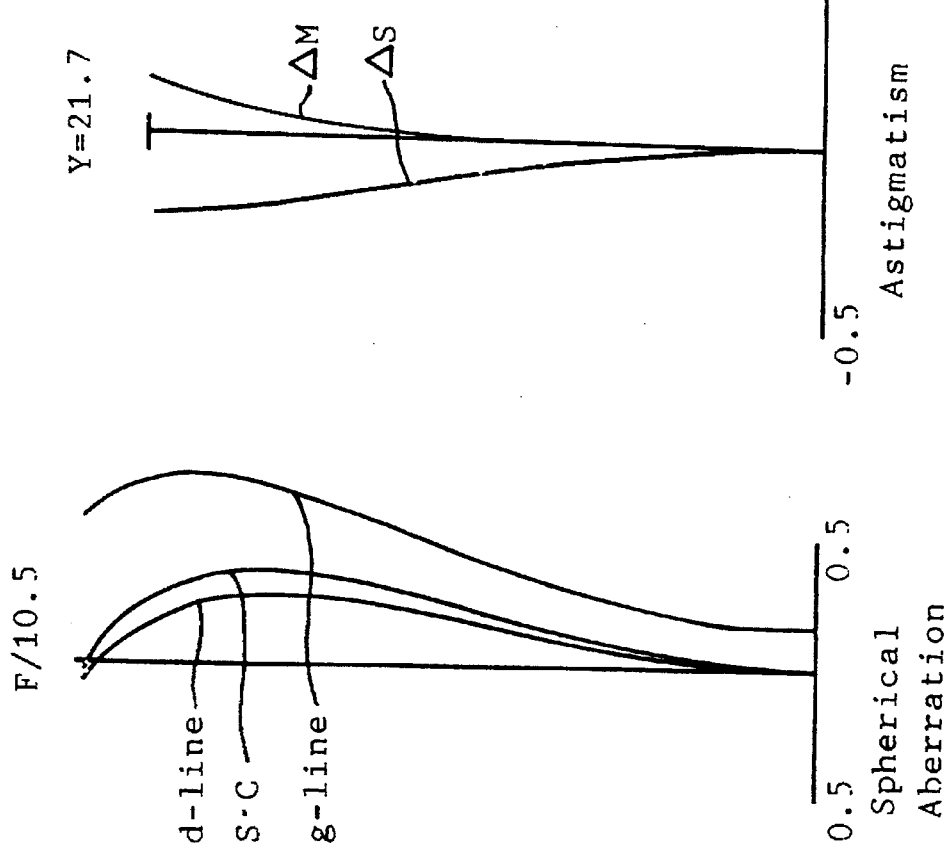
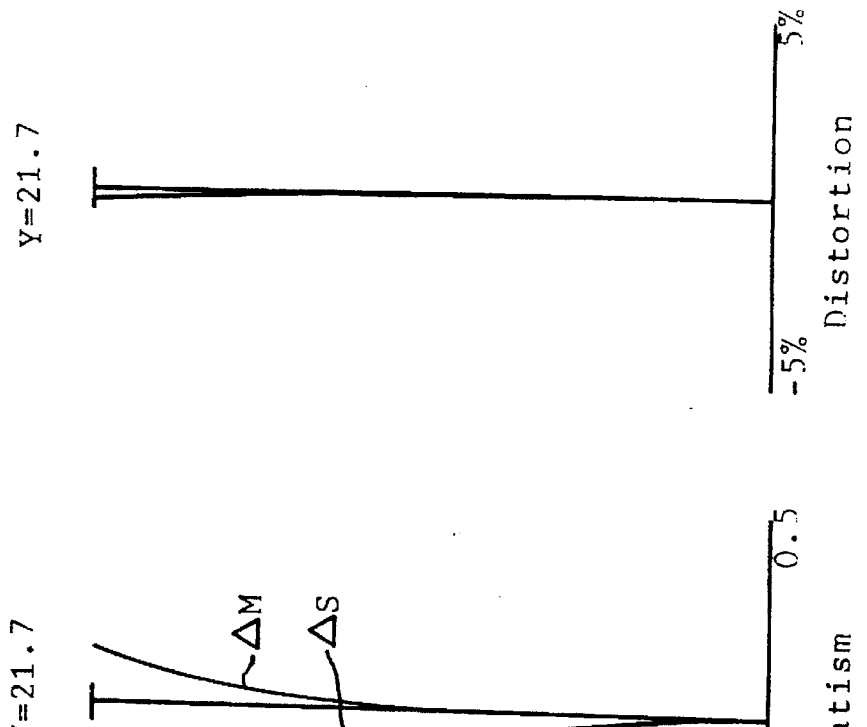
FIG. 3D FIG. 4A FIG. 4B

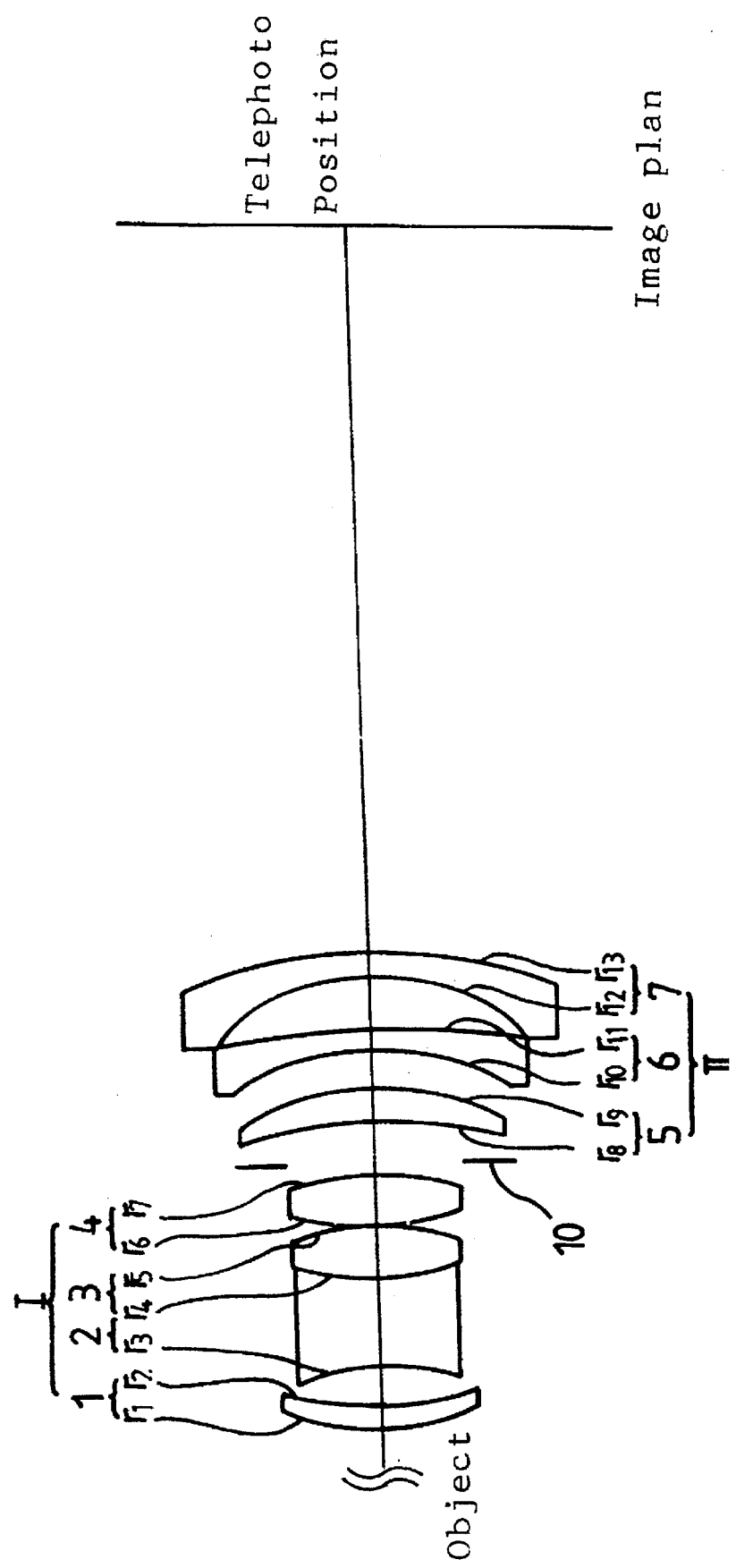

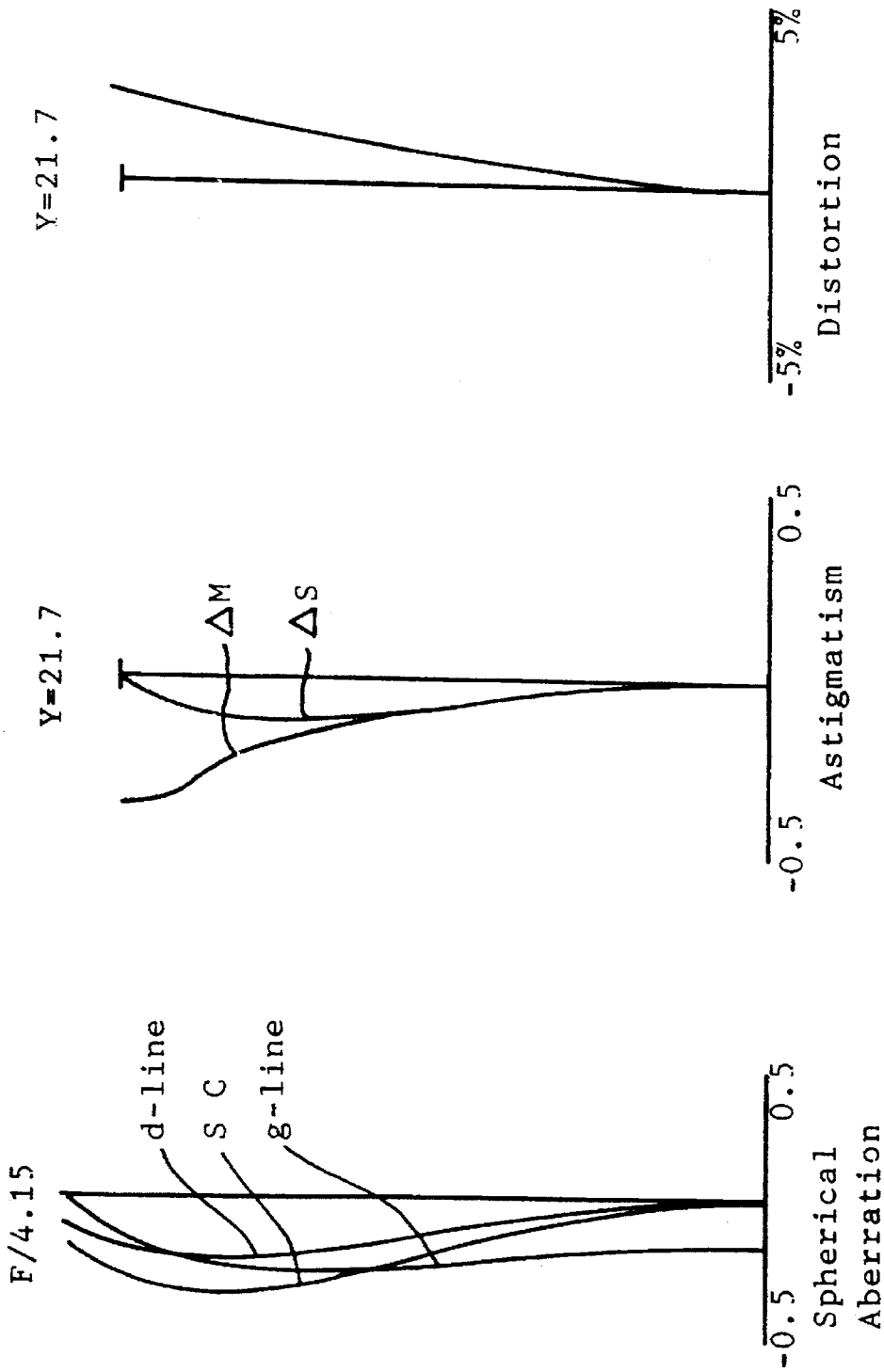

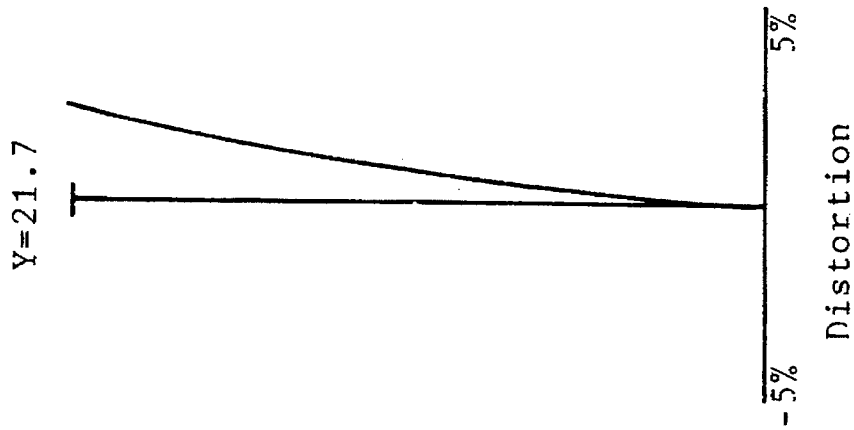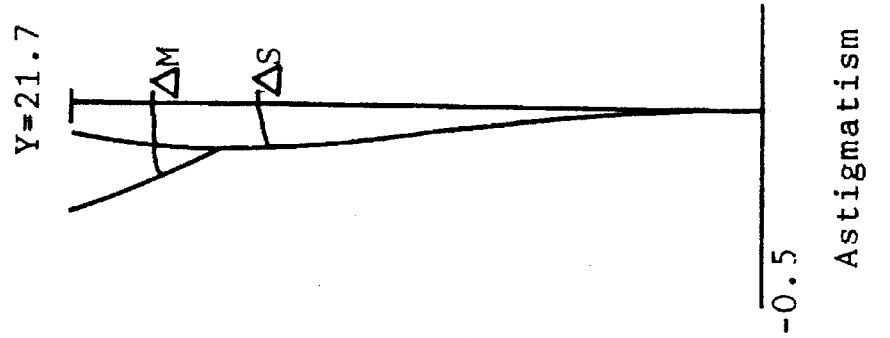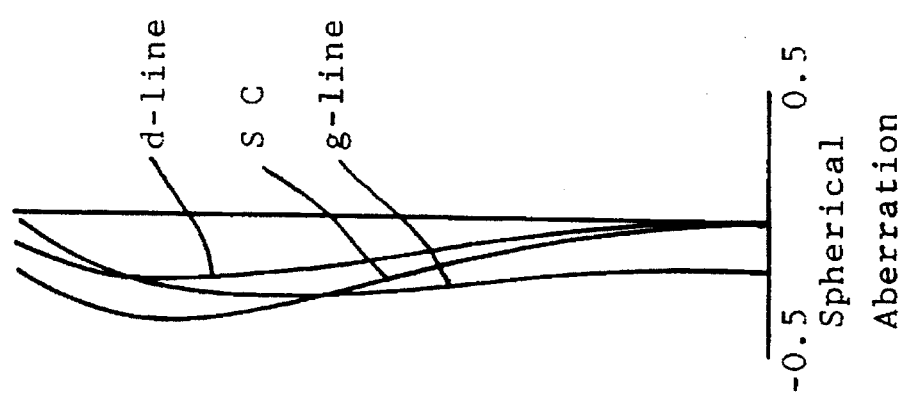

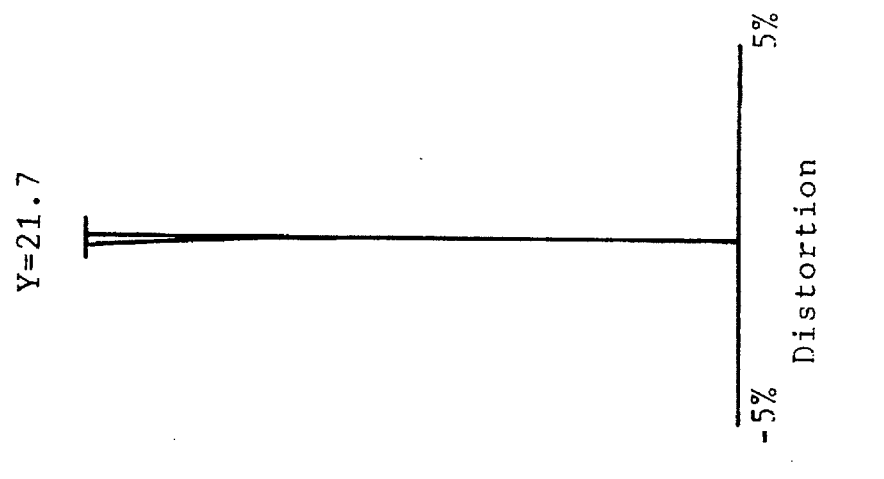
FIG. 11D
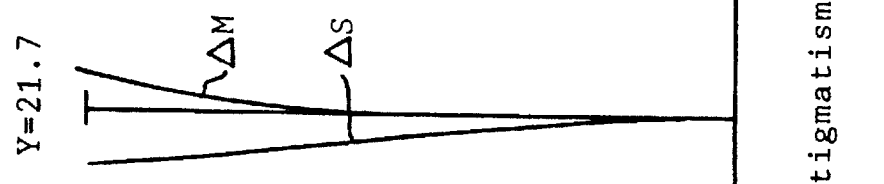
FIG. 12A
FIG. 12B
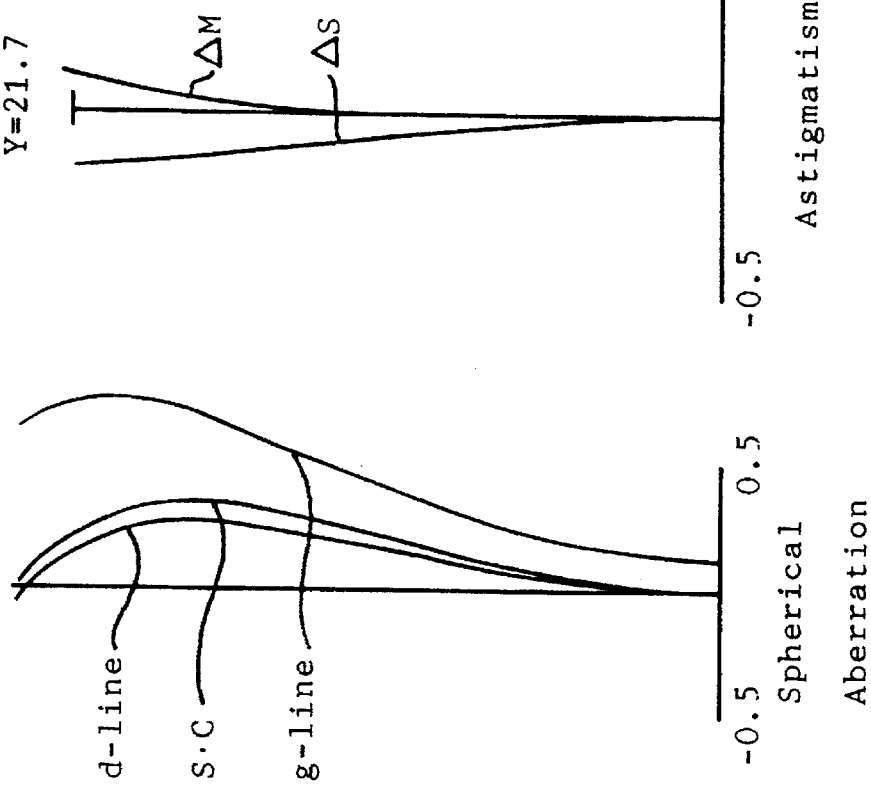

ZOOM LENS

BACKGROUND OF THE INVENTION

1. Field of the Invention

The present invention relates to a zoom lens system, and, more particularly, to a zoom lens system composed of two lens groups. The lens has a high magnification zoom ratio of more than 2 times and uses inexpensive lens materials. Good aberration performance is maintained.

2. Description of the Prior Art

In a zoom lens systems, the overall focal length is adjustable with the widest angle of view at the shortest focal length and the narrowest angle of view at the longest focal length.

Recently, compact "lens shutter" cameras have been introduced with automatic features and a zoom lens with a focal length which varies linearly. The lens shutter cameras are required to be compact, light, and inexpensive especially because they are for nonprofessional users.

Generally, zoom lenses for the lens shutter cameras have either two lens groups or three lens groups. The two lens group configuration is preferred for a zoom ratio of about 2 times because a lens barrel for the two lens group can be designed and controlled easily and produced economically.

For example, Japanese Patent Unexamined Publication No. Hei 1-193808 (title: ZOOM LENS FOR COMPACT CAMERAS, published on Aug. 3, 1989) and Japanese Patent Unexamined Publication No. KOKAI Hei 1-288823 (title: SMALL-SIZED ZOOM LENS, published on Nov. 21, 1989) disclose zoom lenses having two lens groups.

The zoom lens disclosed in Japanese Patent Unexamined Publication No. Hei 1-193808 has a zoom ratio below 1.9 times and uses expensive lens materials. The zoom lens disclosed in Japanese Patent Unexamined Publication No. Hei 1-288823 has many elements, uses aspheric surface lenses made of glass which are expensive, and has a zoom ratio too low to maintain good optical performance.

SUMMARY OF THE INVENTION

The present invention overcomes the problems and disadvantages of the prior art by providing a zoom lens system composed of two lens groups. The lens has a high magnification zoom ratio of more than 2 times and uses inexpensive lens materials. A good aberration performance is maintained.

To achieve the objects and in accordance with the purpose of the invention, as embodied and broadly described herein, the zoom lens system comprises a first lens group having a positive refractive power and a second lens group having a negative refractive power. The distance between the first lens group and the second lens group varies during zooming. The first lens group includes a first lens having a positive refractive power with a shape of a meniscus lens convex toward an object; a second lens having a negative refractive power with two concave sides; a third lens having a positive refractive power with two convex sides; and a fourth lens having a positive refractive power with two convex sides. The second lens group includes a fifth lens having a positive refractive power with a shape of a meniscus lens concave toward an object; a sixth lens having a negative refractive power with a shape of a meniscus lens; and a seventh lens having a negative refractive power; wherein:

[condition 1] $0.3 < f_I/(f_{bT}-f_{bw}) < 0.7$

[condition 2] $m_{2T}/m_{2w} > 2.0$ where $f_I$: combined focal length of the first lens group, $f_{bT}$: back focus distance at a telephoto position, $f_{bw}$: back focus distance at a wide angle position, $m_{2T}$: magnification of the second lens group at a telephoto position, and $m_{2w}$: magnification of the second lens group at a wide angle position.

Also, the present invention provides a zoom lens system comprising a first lens group having a positive refractive power and a second lens group having a negative refractive power. The distance between the first lens group and the second lens group varies during zooming. The first lens group includes a first lens having a positive refractive power with a shape of a meniscus lens convex toward an object; a second lens having a negative refractive power with two concave sides; a third lens having a positive refractive power with two convex sides; and a fourth lens having a positive refractive power with two convex sides. The second lens group includes a fifth lens having a positive refractive power with a shape of a meniscus lens concave toward an object; a sixth lens having a negative refractive power with a shape of a meniscus lens; and a seventh lens having a negative refractive power; wherein:

[condition 3] $-2.7 < N_7 v_7/f_7 < -1.5$

[condition 4] $0.5 < N_6 v_6/N_7 f_7 < 1.33$ where $N_6$: refractive index of the sixth lens $v_6$: ABBE number of the sixth lens $N_7$: refractive index of the seventh lens $v_7$: ABBE number of the seventh lens $f_7$: focal length of the seventh lens.

Further, there is provided a zoom lens system, wherein

[condition 5] $0.85 < v\, an_{II}/(Nan_{II} \cdot f_w) < 1.0$; and

[condition 6] $(v_{apI} - v_{NI})/(v\, an_{II} - v p_{II}) < 0.65$ where $vapI$: average ABBE number of a lens having the positive refractive power in the first lens group, $v_{NI}$: average ABBE number of a lens having the negative refractive power in the first lens group, $Nan_{II}$: average refractive index of a lens having the negative refractive power in the second lens group, $v\, an_{II}$: average ABBE number of a lens having the negative refractive power in the second lens group, $v p_{II}$: average ABBE number of a lens having the positive refractive power in the second lens group, and $f_w$: focal length at a wide angle position of the zoom lens system as a whole.

[condition 7] In the zoom lens system, the first lens group includes at least two pairs of lenses having the same radii of curvature.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate one embodiment of the invention and together with the description serve to explain the principles of the invention.

FIGS. 3A–3D show the extent of various aberrations associated with the zoom lens at a wide angle position according to the first embodiment of the present invention.

FIGS. 4A and 4B show the extent of various aberration associated with the zoom lens at a telephoto position according to the first embodiment of the present invention.

FIG. 6 is a view of a zoom lens at a telephoto position according to a second embodiment of the present invention.

FIGS. 7A–7D show the extent of various aberrations associated with the zoom lens at a wide angle position according to the second embodiment of the present invention.

FIGS. 8A and 8B show the extent of various aberrations associated with the zoom lens at a telephoto position according to the second embodiment of the present invention.

FIGS. 11A–11D show the extent of various aberrations associated with the zoom lens at a wide angle position according to the third embodiment of the present invention.

FIGS. 12A and 12B show the extent of various aberrations associated with the zoom lens at a telephoto position according to the third embodiment of the present invention.

DESCRIPTION OF THE PREFERRED EMBODIMENTS

Reference will now be made in detail to first, second, and third embodiments of the present invention, examples of which are illustrated in the accompanying drawings.

Figure 1:
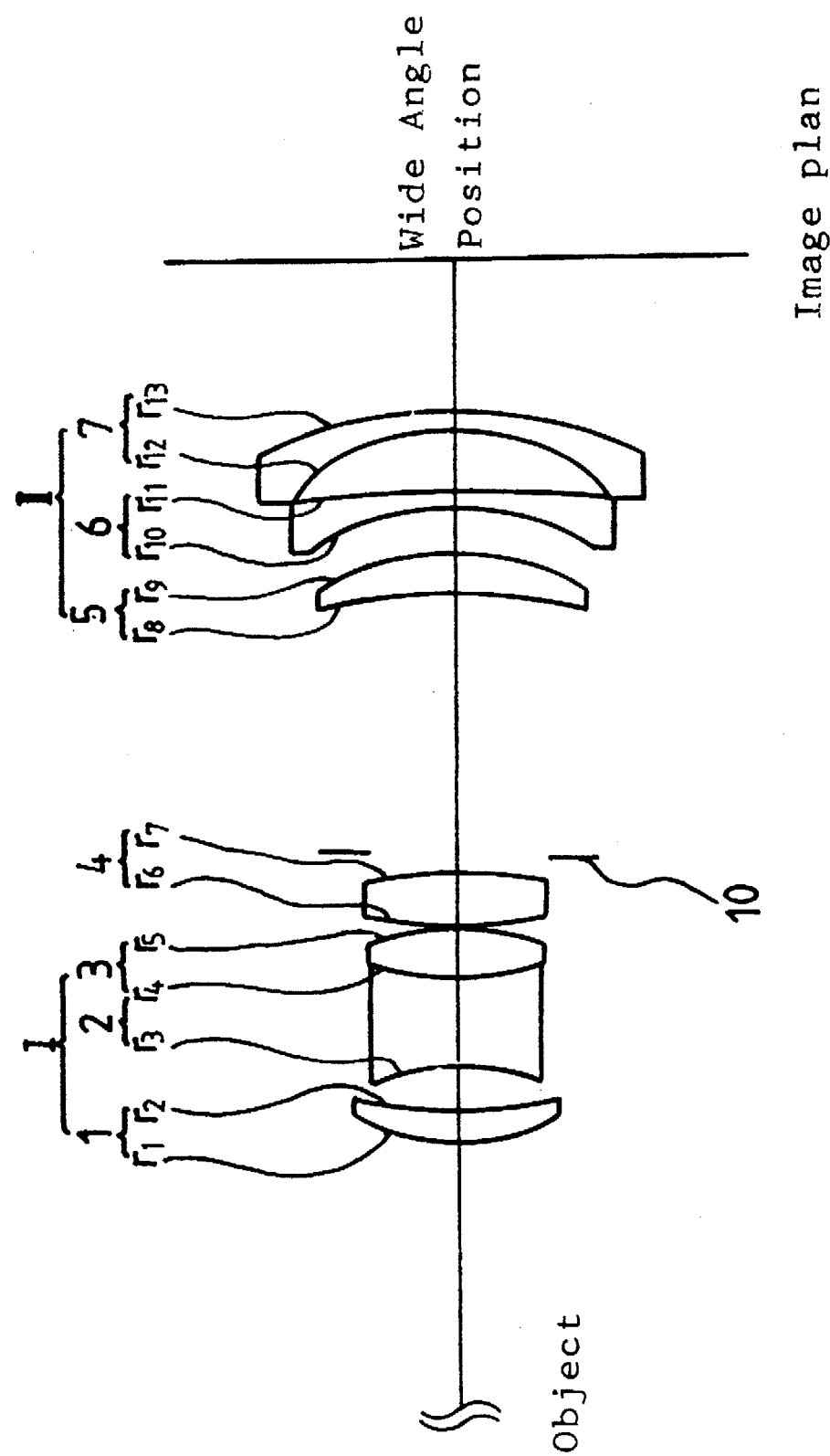
FIG. 1 is a view of a zoom lens at a wide angle position according to a first embodiment of the present invention.
Figure 2:
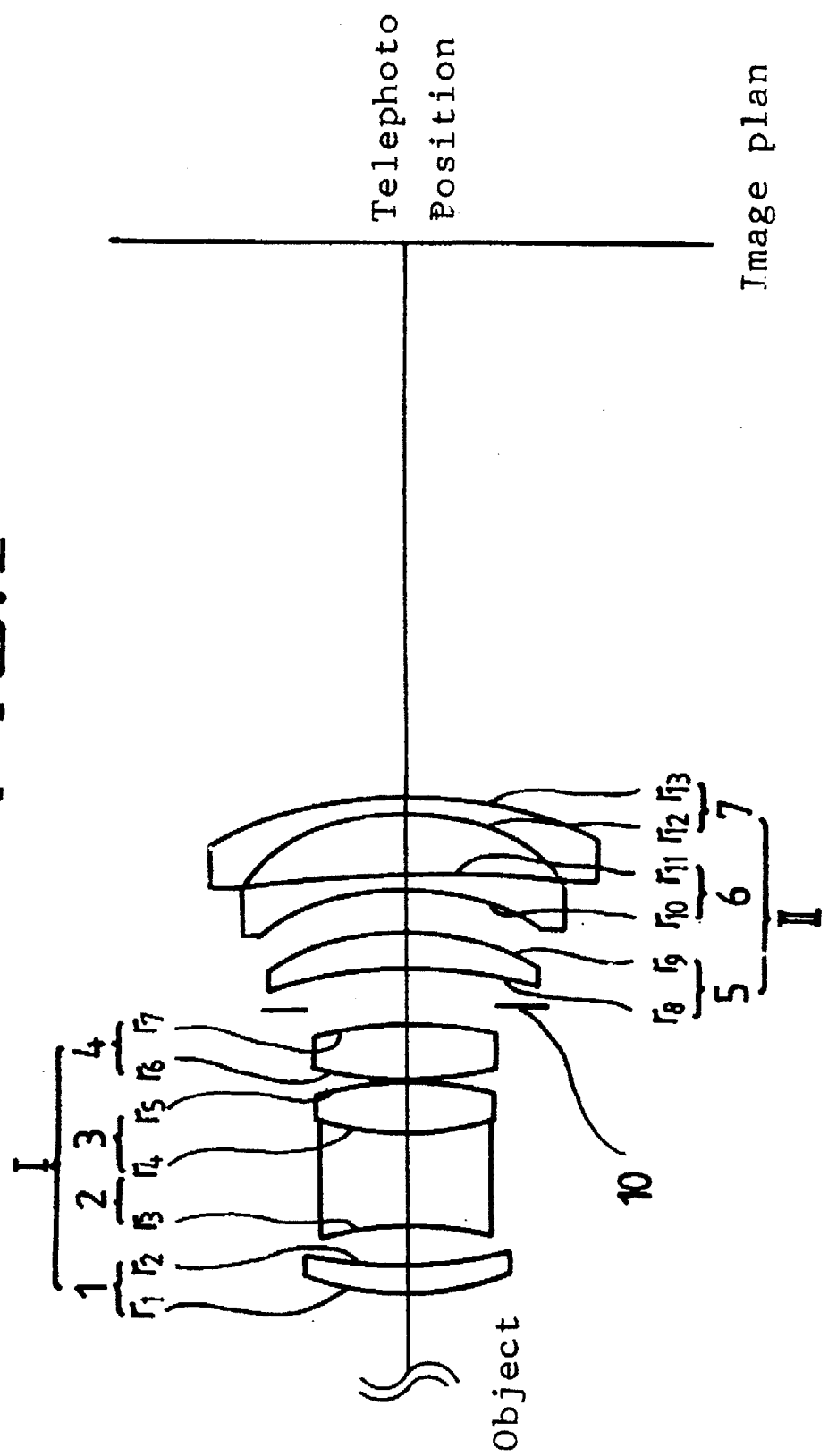
FIG. 2 is a view of a zoom lens at a telephoto position according to a first embodiment of the present invention.

Referring to FIGS. 1 and 2, the zoom lens system according to the first embodiment of the present invention comprises a first lens group I having a positive refractive power and a second lens group II having a negative refractive power. The distance between the first lens group I and the second lens group II is variable during zooming.

The first lens group I includes a first lens 1 having a positive refractive power with a shape of a meniscus lens convex toward an object; a second lens 2 having a negative refractive power with two concave sides; a third lens 3 having a positive refractive power with two convex sides; and a fourth lens 4 having a positive refractive power with two convex sides.

The second lens group includes a fifth lens 5 having a positive refractive power with a shape of a meniscus lens concave toward an object; a sixth lens 6 having a negative refractive power with a shape of a meniscus lens; and a seventh lens 7 having a negative refractive power; wherein:

[condition 1] $0.37 < f_I/(f_{bT} - f_{bw}) < 0.7$

[condition 2] $m_{2T}/m_{2w} > 2.0$ where $f_I$: combined focal length of the first lens group, $f_{bT}$: back focus distance at a telephoto position, $f_{bw}$: back focus distance at a wide angle position, $m_{2T}$: magnification of the second lens group at a wide angle position, and $m_{2w}$: magnification of the second lens group at telephoto position.

The variables $f_{bT}$ and $m_{2w}$ are preferably measured at the longest variable focal length position, and the variables $f_{bw}$ and $m_{2T}$ are preferably measured at the shortest variable focal length.

In the zoom lens system, the first lens group I includes at least two pairs of lenses having the same radii of curvature.

Referring to FIG. 1, a variable aperture 10 is provided between the first lens group I and the second lens group II. The variable aperture 10 may be a shutter in a lens shutter camera.

Also, the present invention provides a zoom lens system comprising a first lens group I having a positive refractive power and a second lens group II having a negative refractive power. The distance between the first lens group I and the second lens group II is variable during zooming.

The first lens group I includes a first lens having a positive refractive power with a shape of a meniscus lens convex toward an object; a second lens having a negative refractive power with two concave sides; a third lens having a positive refractive power with two convex sides; and a fourth lens having a positive refractive power with two convex sides.

The second lens group II includes a fifth lens having a positive refractive power with a shape of a meniscus lens concave toward an object; a sixth lens having a negative refractive power with a shape of a meniscus lens; and a seventh lens having a negative refractive power; wherein

[condition 3] $-2.7 < N_7 \upsilon_7/f_7 < -1.5$

[condition 4] $0.5 < N_6 \upsilon_6/N_7 f_7 < 1.33$ where $N_6$: refractive index of the sixth lens $\upsilon_6$: ABBE number of the sixth lens $N_7$: refractive index of the seventh lens $\upsilon_7$: ABBE number of the seventh lens $f_7$: focal length of the seventh lens Further, there is provided a zoom lens system, wherein

[condition 5] $0.85 < \upsilon\, an_{II}/(Nan_{II} \cdot f_w) < 1.0$; and

[condition 6] $(\upsilon_{apI} - \upsilon_{NI})/(\upsilon\, an_{II} - \upsilon p_{II}) < 0.65$ where $Nan_{II}$: average ABBE number of a lens having the positive refractive power in the first lens group, $\upsilon_{NI}$: average ABBE number of a lens having the negative refractive power in the first lens group, $Nan_{II}$: average refractive index of a lens having the negative refractive power in the second lens group, $\upsilon\, an_{II}$: average ABBE number of a lens having the negative refractive power in the second d lens group, $\upsilon p_{II}$: average ABBE number of lens having the positive refractive power in the second lens group, and $f_w$: focal length at a wide angle position of the zoom lens system as a whole.

[condition 7] In the zoom lens system, the first lens group includes at least two pairs of lenses having the same radii of curvature.

The $f_w$ is preferably measured at the shortest variable focal length position.

The advantages of the zoom lens system of the present invention, as embodied herein, are as follows.

Condition 1 relates to the arrangement of the refractive power of the first lens group I and the second lens group II and compensates the balance of aberrations throughout a zooming range. However, at a range below the lower limit of condition 1, the refractive power of the first lens group I becomes too strong such that variations in aberrations, especially spherical aberration and COMA aberration, during zooming become too large. In addition, the movement range of the second lens group II is increased, hindering the design of a compact and light lens operating mechanism.

On the contrary, at a range higher than the upper limit of condition 1, the refractive power of the first lens group I becomes too weak such that the back focus distance at the wide angle position becomes too short and an effective diameter of the second lens group II becomes too large to make material costs.

Condition 2 relates to zoom magnification. Under condition 2, the lens system of the present invention should have a zoom ratio of more than two times.

Conditions 3 and 4 relate to the material used for the second lens group II. It is possible to reduce the material costs of the lens system and provide a zoom lens system having good aberration performance by satisfying conditions 3 and 4.

Conditions 5 and 6 relate to compensating for chromatic aberration of the lens system as a whole and to the proper arrangement of materials according to the ABBE number to compensate for the chromatic aberration of the lens system made of inexpensive materials satisfying conditions 3 and 4.

Condition 7 relates to productivity. The lenses of the first lens group I can be constructed to have the same radii of curvature which makes the lenses easy to manufacture and assemble and contributes to improved productivity.

Sets of exemplary parameter values for the zoom lens system according to first, second, and third preferred embodiments of the present invention are as follow.

Throughout description of the preferred embodiments, f is a focal length, ri (i=1 to 13) is a curvature radius of a refractive surface, di (i=1 to 12) is a thickness of a lens or a distance between lenses, N is a d-line refractive index of the lens, $\upsilon$ is an ABBE number, m is the magnification of a lens system as a whole, and $\omega$ is the half view angle.

FIGS. 1 and 2 show the first embodiment of the zoom lens. A set of exemplary parameter values for the zoom lens system according to the first embodiment is provided in reference to Table 1, where an F number, $F_{no}$ is 1:4.15 to 10.5, a focal length, f is 39.4 mm to 100.6 mm, a half view angle, $\omega$ is 28.8 degrees to 12.2 degrees, and a back focus distance, $f_B$ is 8.50 mm to 69.19 mm.

TABLE 1

| surface number | r | d | N | $\upsilon$ |
| --- | --- | --- | --- | --- |
| 1 | 15.266 | 1.66 | 1.60342 | 38.0 |
| 2 | 24.714 | 2.27 | | |
| 3 | −17.399 | 5.44 | 1.80450 | 39.6 |
| 4 | 17.399 | 2.89 | 1.56883 | 56.0 |
| 5 | −17.399 | 0.10 | | |
| 6 | 27.752 | 3.12 | 1.51680 | 64.2 |
| 7 | −27.752 | 15.993 to 3.200 | | |
| 8 | −33.333 | 2.28 | 1.62588 | 35.7 |
| 9 | −16.149 | 2.49 | | |
| 10 | −16.149 | 0.88 | 1,71300 | 53.9 |
| 11 | −95.436 | 3.60 | | |
| 12 | −13.638 | 0.80 | 1.51680 | 64.2 |
| 13 | −28.873 | | | |

The values of conditions disclosed in relations (1) to (7) according to the first preferred embodiment of the present invention are as follows:

Condition 1 $f_t/(f_{bT}-f_{bw})=0.476$

Condition 2 $m_{2T}/m_{2w}=2.554$

Condition 3 $M_{7\upsilon}7/f_7=-1.912$

Condition 4 $N_{6\upsilon}6/N_7f_7=0.607$

Condition 5 $\upsilon_{aNII}/(N_{aNII} \times f_w)=0.928$

Figure 5:
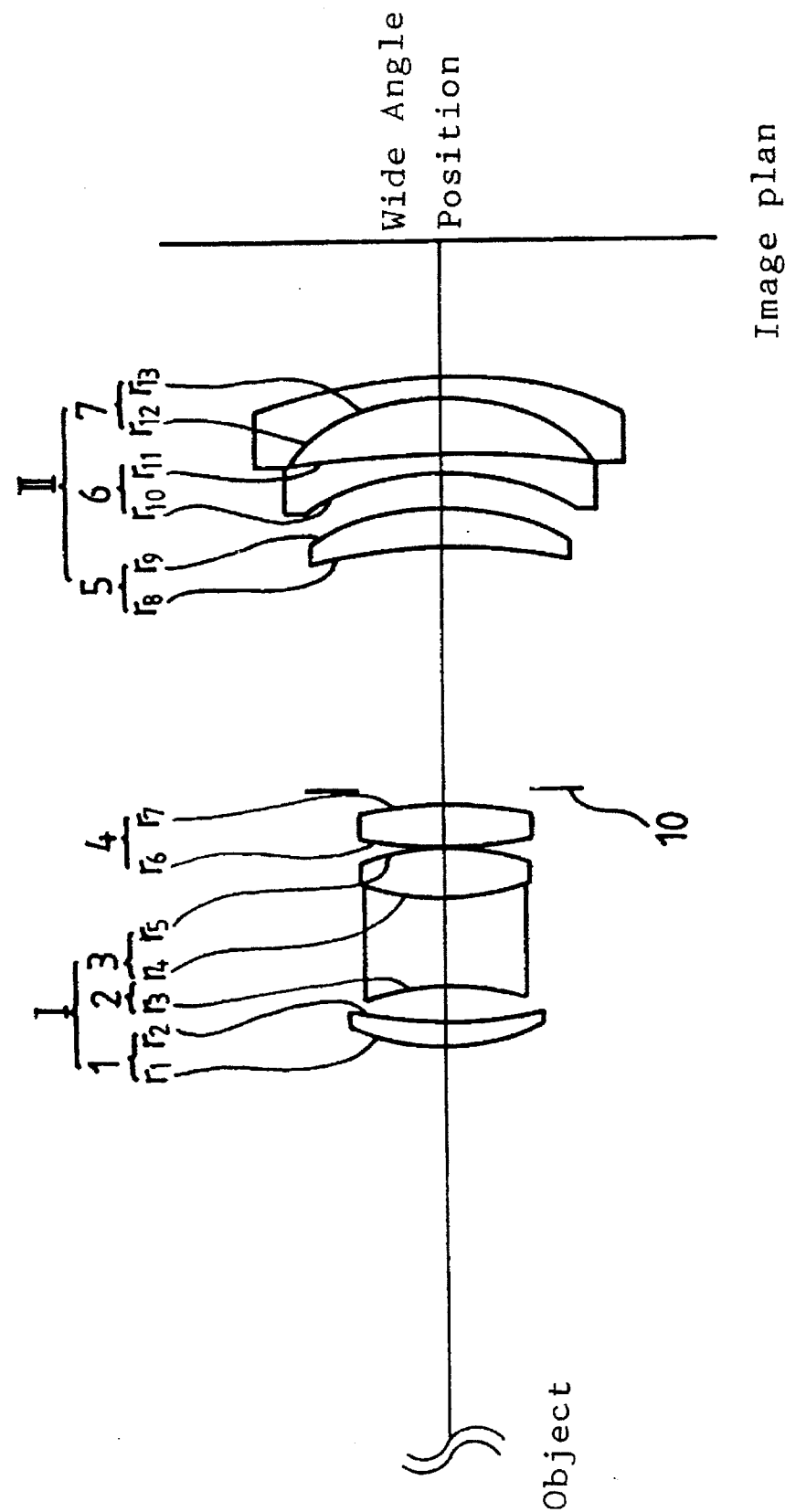
FIG. 5 is a view of a zoom lens at a wide angle position according to a second embodiment of the present invention.
Figures 7D, 8A, 8B:
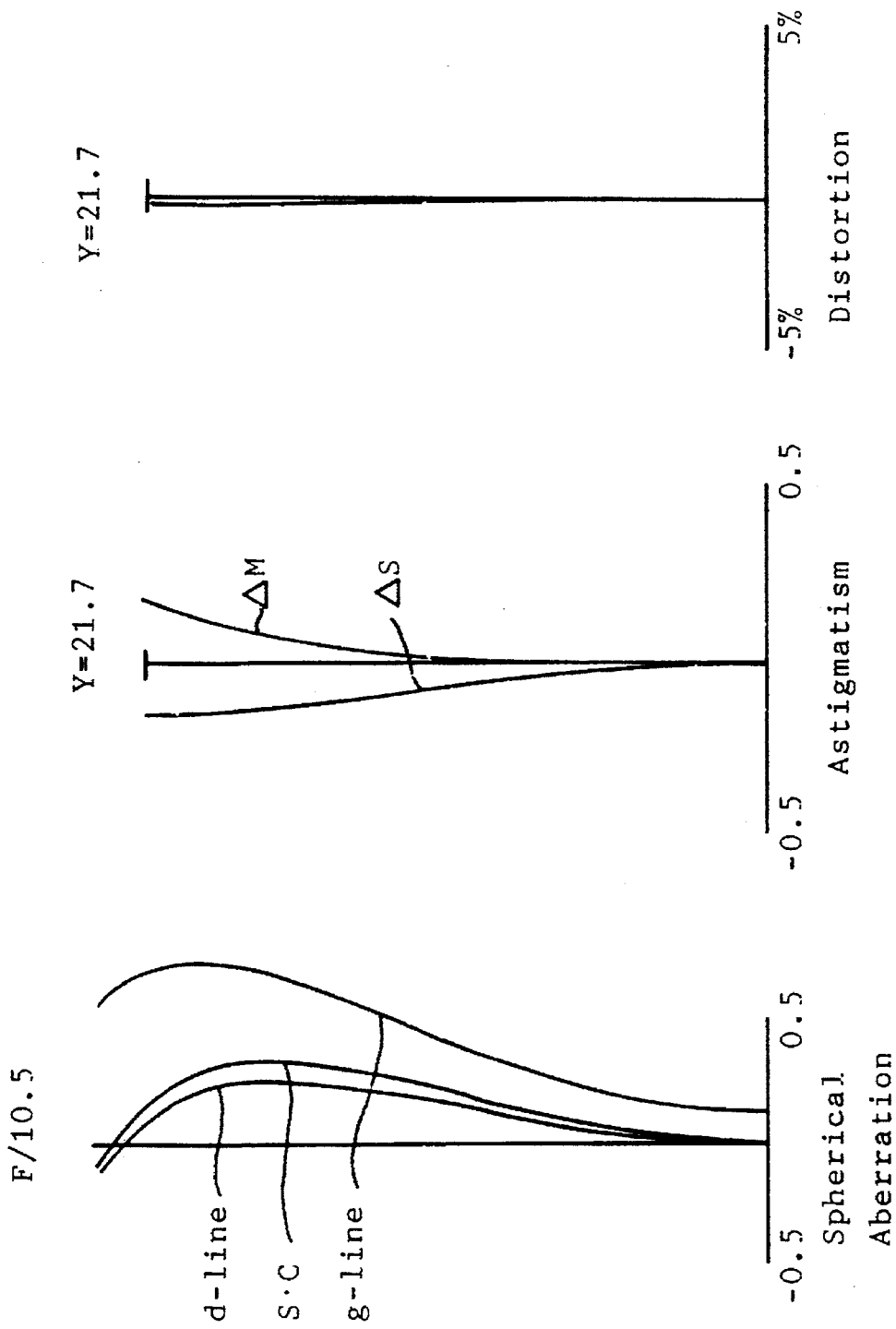

Condition 6 $(\upsilon_{apI}-\upsilon_{NI})/(\upsilon_{aNII}-\upsilon_{pII})=0.562$ Condition 7 The first lens group includes at lease two pairs of lenses having the same radii of curvature: $r_3=r_5=r_4$, $r_6=r_7$ FIGS. 5 and 6 show the second embodiment of the zoom lens. A set of exemplary parameter values for the zoom lens system according to the second embodiment is provided in reference to Table 2, where an F number of the zoom lens, $F_{no}$ is 1:4.15 to 10.5, a focal length, f is 39.4 mm to 100.59 mm, a half view angle, $\omega$ is 28.8 degrees to 12.2 degrees, and a back focus distance, $f_B$ is 9.20 mm to 70.23 mm.

TABLE 2

| Surface number | r | d | N | $\upsilon$ |
| --- | --- | --- | --- | --- |
| 1 | 14.853 | 1.40 | 1.60342 | 38.0 |
| 2 | 24.777 | 2.18 | | |
| 3 | −17.060 | 5.50 | 1.80450 | 39.6 |
| 4 | 17.060 | 3.00 | 1.56883 | 56.0 |
| 5 | −17.060 | 0.10 | | |
| 6 | 27.691 | 2.53 | 1.51680 | 64.2 |
| 7 | −27.691 | 15.481 to 3.200 | | |
| 8 | −35.692 | 2.33 | 1.62004 | 36.3 |
| 9 | −16.109 | 2.36 | | |
| 10 | −16.109 | 1.00 | 1.71300 | 53.9 |
| 11 | −90.342 | 3.33 | | |
| 12 | −13.885 | 1.20 | 1.51680 | 64.2 |
| 13 | −34.484 | | | |

The values of conditions disclosed in relations (1) to (7) according to the second preferred embodiment of the present invention are as follows:

Condition 1 $f_t/(f_{bT}-f_{bw})=0.462$

Condition 2 $m_{2T}/m_{2w}=2.554$

Condition 3 $N_{7\upsilon}/f_7=-2.122$

Condition 4 $N_{6\upsilon6}/N_7f_7=0.681$

Condition 5 $\upsilon_{aNII}/N_{aNII} \times f_w)=0.928$

Figure 9:
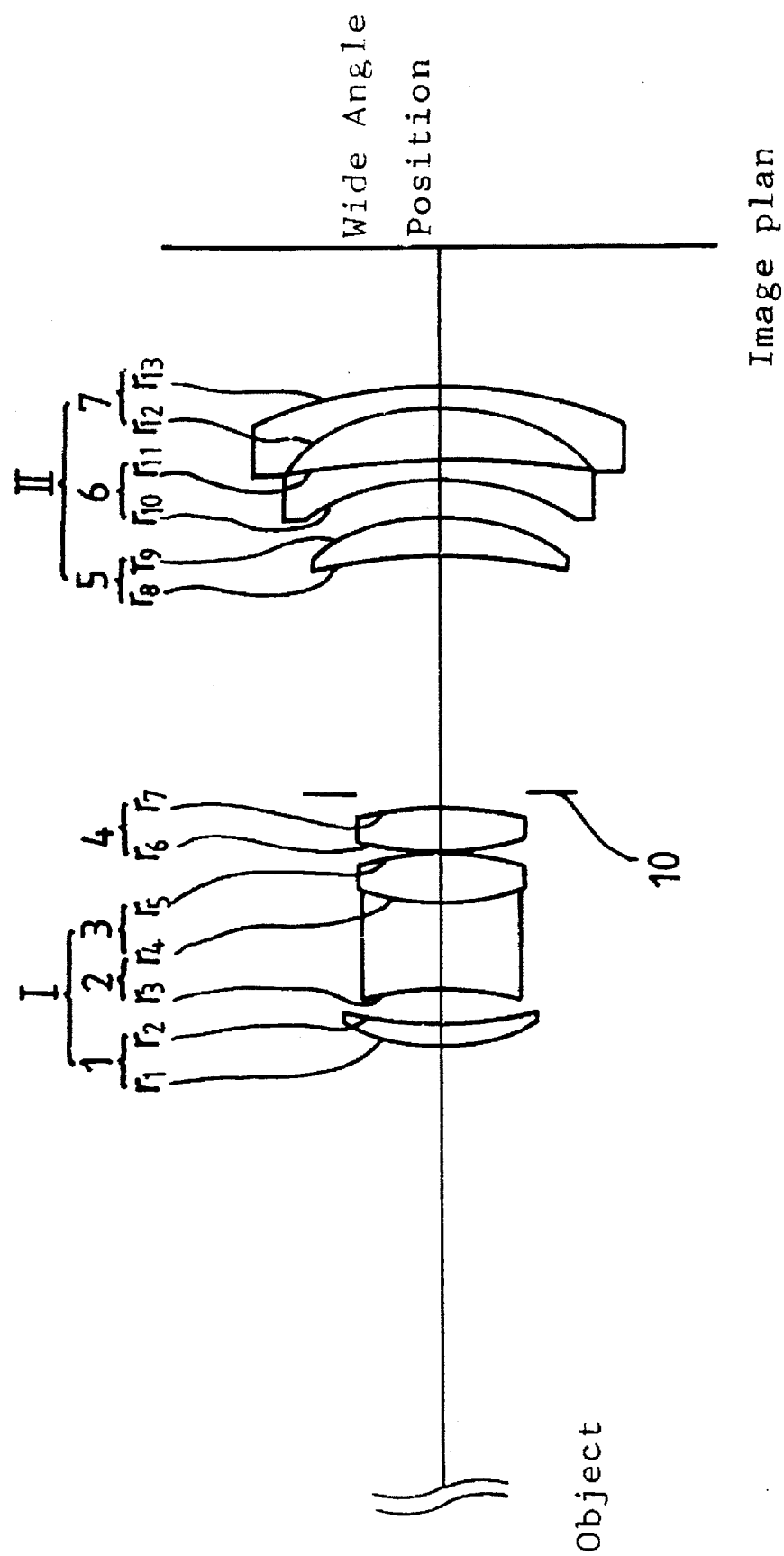
FIG. 9 is a view of a zoom lens at a wide angle position according to a third embodiment of the present invention.
Figure 10:
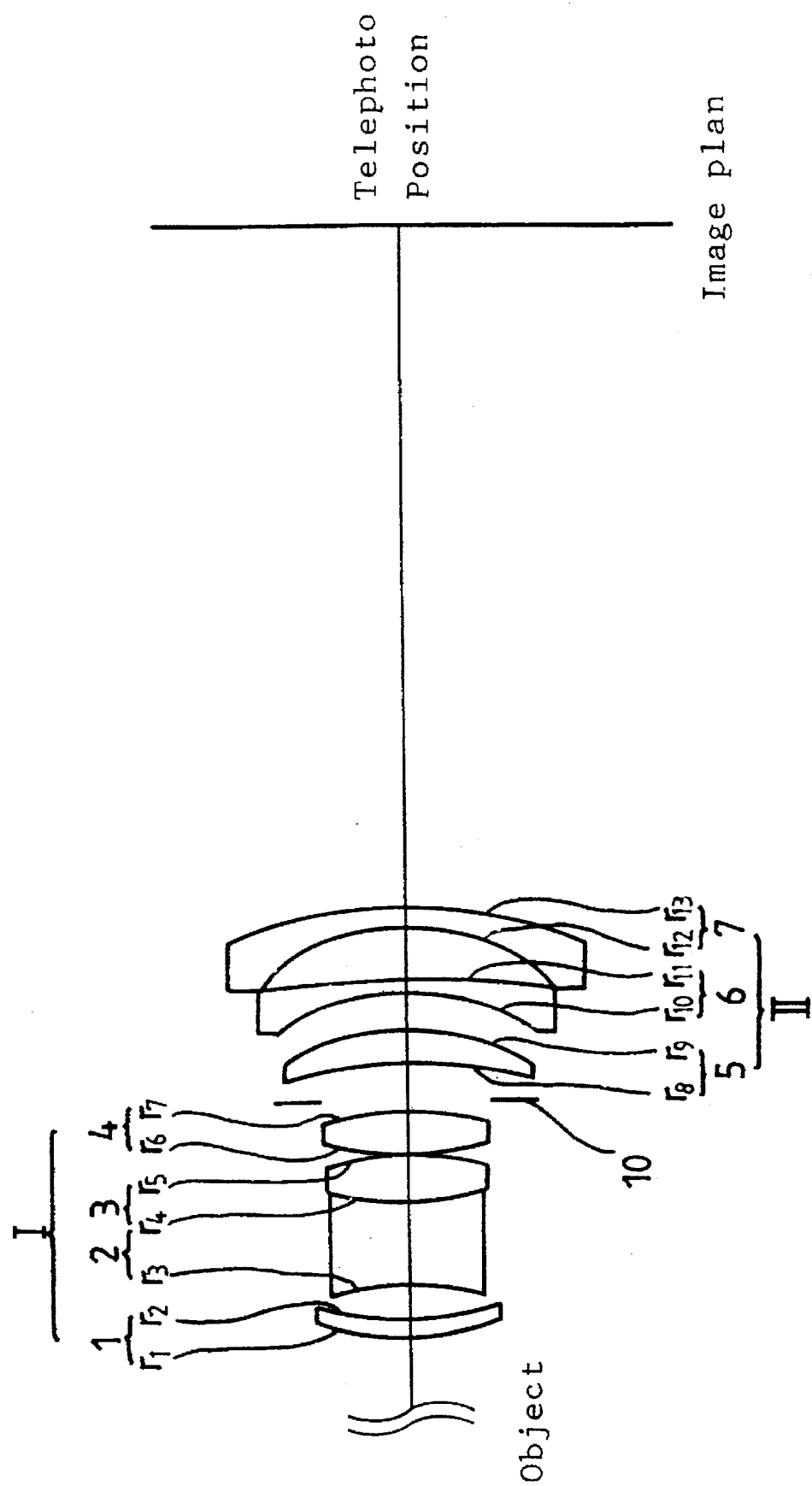
FIG. 10 is a view of a zoom lens at a telephoto position according to a third embodiment of the present invention.

Condition 6 $(\upsilon_{apI}-\upsilon_{NI})/(\upsilon_{aNII}-\upsilon_{pII})=0.576$ Condition 7 The first lens group includes at least two pairs of lenses having the same radii of curvature; $r_3=r_5=r_4$, $r_6=r_7$ FIGS. 9 and 10 show the third embodiment of the zoom lens. A set of exemplary parameter values for the zoom lens system according to the third embodiment is provided in reference to Table 3, where an $F_{no}$ of the zoom lens, $F_n$ is 1:4.15 to 10.5, a focal length, f is 39.1 mm to 100.6 mm, a half view angle, $\omega$ is 28.8 degrees to 12.2 degrees, and a back focus distance, $f_B$ is 9.06 mm to 70.37 mm.

TABLE 3

| surface number | r | d | N | $\upsilon$ |
| --- | --- | --- | --- | --- |
| 1 | 14.696 | 1.30 | 1.60342 | 38.0 |
| 2 | 24.132 | 2.10 | | |
| 3 | −17.015 | 5.50 | 1.80450 | 39.6 |
| 4 | 17.015 | 3.00 | 1.56883 | 56.0 |
| 5 | −17.015 | 0.10 | | |
| 6 | 27.688 | 2.49 | 1.51680 | 64.2 |
| 7 | −27.688 | 15.450 | | |
| 8 | −33.762 | 2.18 | 1.62588 | 35.7 |
| 9 | −16.089 | 2.46 | | |
| 10 | −16.089 | 1.00 | 1.71300 | 53.9 |
| 11 | −94.844 | 3.49 | | |
| 12 | −13.622 | 1.20 | 1.51680 | 64.2 |
| 13 | −30.996 | | | |

The values of conditions disclosed in relations (1) to (7) according to the third preferred embodiment of the present invention are as follows:

| Condition 1 | $f_1 / (f_{bT} - f_{bw}) = 0.457$ |
| --- | --- |
| Condition 2 | $m_{2T} / m_{2w} = 2.573$ |
| Condition 3 | $N_{7v} / f_7 = -2.030$ |
| Condition 4 | $N_{6v6} / N_7 f_7 = 0.643$ |
| Condition 5 | $v_{aNII} / (N_{aNII} \times f_w) = 0.935$ |
| Condition 6 | $(v_{apI} - v_{NI}) / (v_{aNII} - v_{pII}) = 0.562$ |
| Condition 7 | The first lens group includes at least two pairs of lenses having the same radii of curvature: $r_3 = r_5 = r_4$, $r_6 = r_7$ |

As described above, there is provided a zoom lens system composed of two lens groups having a high magnification zoom ratio of more than 2 times in which inexpensive lens materials can be used and good aberration performance is maintained.

Other embodiments of the invention will be apparent to those skilled in the art from consideration of the specification and practice of the invention disclosed herein. It is intended that the specification and examples can be considered as exemplary only, with a true scope and spirit of the invention being indicated by the following claims.

For example, the embodiments of this invention use a still picture 35 mm film format, while other lenses for different formats and applications may be made in accordance with this invention. Additionally, lenses according to this invention are not limited to lens shutter cameras, but may also be used with other cameras such as focal plane shutter cameras.

What is claimed is:

1. A zoom lens system, comprising:
    a first lens group having a positive refractive power;
    a second lens group having a negative refractive power, the distance between the first lens group and the second lens group being variable during zooming,
    wherein said first lens group comprises:
        a first lens having a positive refractive power with a shape of a meniscus lens convex toward an object;
        a second lens having a negative refractive power with two concave sides;
        a third lens having a positive refractive power with two convex sides; and
        a fourth lens having a positive refractive power with two convex sides;
    wherein said second lens group comprises:
        a fifth lens having a positive refractive power with a shape of a meniscus lens concave toward an object;
        a sixth lens having a negative refractive power with a shape of a meniscus lens; and
        a seventh lens having a negative refractive power;
    wherein $$0.37 < f_1/(f_{bT}-f_{bw}) < 0.7$$

$$m_{2T}/m_{2w} > 2.0$$

where
    $f_1$: combined focal length of the first lens group,
    $f_{bT}$: back focus distance at a telephoto position,
    $f_{bw}$: back focus distance at a wide angle position,
    $m_{2T}$: magnification of the second lens group at a telephoto position, and
    $m_{2w}$: magnification of the second lens group at a wide angle position.

2. The zoom lens system of claim 1, wherein the first lens group includes at least two pairs of lens sides having the same radii of curvature.

3. A zoom lens system, comprising:
    a first lens group having a positive refractive power;
    a second lens group having a negative refractive power, the distance between the first lens group and the second lens group being variable during zooming,
    wherein said first lens group comprises:
        a first lens having a positive refractive power with a shape of a meniscus lens convex toward an object;
        a second lens having a negative refractive power with two concave sides;
        a third lens having a positive refractive power with two convex sides; and
        a fourth lens having a positive refractive power with two convex sides;
    wherein said second lens group comprises:
        a fifth lens having a positive refractive power with a shape of a meniscus lens concave toward an object;
        a sixth lens having a negative refractive power with a shape of a meniscus lens; and
        a seventh lens having a negative refractive power;
    wherein $$-2.7 < N_7 v_7/f_7 < -1.5$$

$$0.5 < N_6 v_6/N_7 f_7 < 1.33$$

where
    $N_6$: refractive index of the sixth lens
    $v_6$: ABBE number of the sixth lens
    $N_7$: refractive index of the seventh lens
    $v_7$: ABBE number of the seventh lens
    $f_7$: focal length of the seventh lens.

4. The zoom lens system of claim 3, wherein the zoom lens system has the following characteristics:

$$0.85 < v\ an_{II}/(Nan_{II} \cdot f_w) < 1.0;\ \text{and}$$

$$(v_{apI}-v_{NI})/(v\ an_{II}-v p_{II}) < 0.65$$

where:
    $v_{apI}$: average ABBE number of a lens having the positive refractive power in the first lens group,
    $v_{NI}$: average ABBE number of a lens having the negative refractive power in the first lens group,
    $Nan_{II}$: average refractive index of a lens having the negative refractive power in the second lens group,
    $v\ an_{II}$: average ABBE number of a lens having the negative refractive power in the second lens group,
    $v p_{II}$: average ABBE number of a lens having the positive refractive power in the second lens group, and
    $f_w$: focal length at the widest angle position of the zoom lens system as a whole.

5. The zoom lens system of claim 3, wherein the first lens group includes at least two pairs of lens sides having the same radii of curvature.

* * * * *

UNITED STATES PATENT AND TRADEMARK OFFICE
CERTIFICATE OF CORRECTION

PATENT NO. : 5,636,061
DATED : June 03, 1997
INVENTOR(S) : Geon-Mo KANG

It is certified that error appears in the above-indentified patent and that said Letters Patent is hereby corrected as shown below:

Claim 4, column 8, line 42, "$(\mathbf{v}\ an_{II} - \mathbf{v} p_{11})$" should read --$(\mathbf{v}\ an_{II} - \mathbf{v} p_{II})$--.

Signed and Sealed this

Ninth Day of December, 1997

*Attest:*

*Attesting Officer*

BRUCE LEHMAN

*Commissioner of Patents and Trademarks*